(12) United States Patent
Svensson et al.

(10) Patent No.: US 8,812,211 B2
(45) Date of Patent: Aug. 19, 2014

(54) ADAPTING A BRAKING PROCESS

(71) Applicant: Ford Global Technologies, LLC, Dearborn, MI (US)

(72) Inventors: Thomas Svensson, Leichlingen (DE); Ian Moore, Pulheim (DE); Rudolf Daniels, Wermelskirchen (DE)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 13/910,156

(22) Filed: Jun. 5, 2013

(65) Prior Publication Data

US 2013/0332043 A1  Dec. 12, 2013

(30) Foreign Application Priority Data

Jun. 12, 2012 (DE) .......................... 10 2012 209 748

(51) Int. Cl.
*G08G 7/00* (2006.01)

(52) U.S. Cl.
USPC ............. 701/70; 303/138; 303/155; 303/160; 303/166

(58) Field of Classification Search
USPC ..................... 701/70; 303/138, 155, 160, 166
See application file for complete search history.

(56) References Cited

U.S. PATENT DOCUMENTS

| | | | |
|---|---|---|---|
| 4,872,731 A | | 10/1989 | Nakamura |
| 4,962,969 A | * | 10/1990 | Davis ................................ 303/3 |
| 5,324,102 A | * | 6/1994 | Roll et al. ..................... 303/137 |
| 5,386,366 A | * | 1/1995 | Roll et al. ........................ 701/70 |
| 5,676,435 A | * | 10/1997 | Breitenbacher et al. ...... 303/186 |
| 6,322,164 B1 | * | 11/2001 | Sakamoto et al. ......... 303/115.4 |
| 6,460,943 B1 | | 10/2002 | Toepfer et al. |
| 6,520,601 B1 | * | 2/2003 | Kahl et al. .................... 303/167 |
| 7,134,733 B2 | * | 11/2006 | Eckert et al. .................. 303/123 |
| 7,672,769 B2 | * | 3/2010 | Braeuchle et al. .............. 701/70 |
| 2009/0055064 A1 | | 2/2009 | Lin |
| 2010/0274457 A1 | | 10/2010 | Cahill |

FOREIGN PATENT DOCUMENTS

| | | |
|---|---|---|
| DE | 4424317 A1 | 1/1996 |
| DE | 19725116 A1 | 12/1998 |
| DE | 102009038244 A1 | 5/2010 |

OTHER PUBLICATIONS

German Search Report, 10 2012 209 748.1, May 30, 2013, p. 1-7.

* cited by examiner

*Primary Examiner* — Russell Frejd
(74) *Attorney, Agent, or Firm* — Raymond L. Coppiellie; Bejin VanOphem & Bieneman PLC

(57) ABSTRACT

A deceleration of a vehicle is determined based on one or more wheel speeds of the vehicle. A brake pressure of the vehicle is determined. A model of a relationship of the deceleration and the brake pressure is produced. At least one of a vehicle load and a vehicle weight is determined by using the model. The brake pressure is adapted to at least one of the determined vehicle load and the vehicle weight.

16 Claims, 2 Drawing Sheets

ADAPTING A BRAKING PROCESS

CROSS-REFERENCE TO RELATED APPLICATIONS

This application claims priority to German Patent Application No. 10 2012 209 748.1, filed on Jun. 12, 2012, which application is hereby incorporated by reference in its entirety.

BACKGROUND

This disclosure relates to adapting the braking process for different loads of a vehicle, and to a brake system for a vehicle.

The difference in weight between a vehicle with a driver and a fully laden vehicle gives rise to a large difference both in the feeling or feedback of the brake pedal and in the maximum or maximum possible braking power. The detection of the load or of the overall weight is used only rarely since the necessary additional sensor system is expensive and costly.

For utility vehicles there are controllers for load adaptation (LAC, Load Adaptive Control), which are a component of the electronic stability control (ESC). However, the LAC function is restricted to adapting the stability control. Accordingly, a vehicle with a light load may require a greater degree of stability control for oversteering situations, while a vehicle with a heavy load requires a greater degree of stability control for understeering situations or in order to prevent a rollover. A passenger car does not usually carry loads which are so heavy that they require the use of load adaptive control (LAC).

US 2009/05504 A1 presents a brake control method in which a consistent relationship is produced between the brake pedal input and the deceleration of the vehicle. This requires a complex sensor system.

US 2010/274457 A1 discloses a brake system for selectively actuating a plurality of brakes at various wheels of the vehicle; different loads are not taken into account.

U.S. Pat. No. 6,460,943 B1 describes a method for controlling the brake pressure of a motor vehicle in which a proportionality factor between the deceleration of the vehicle and the brake pressure is tracked in a certain range.

U.S. Pat. No. 4,872,731 A presents a controller for a brake system having an equalizing cylinder in the master cylinder system; different loads are not taken into account.

SUMMARY

Adapting a braking process for different loads of a vehicle may include:
  determining a deceleration of the vehicle on the basis of one or more wheel speeds of the vehicle;
  determining a brake pressure of the vehicle;
  producing a model that relates the deceleration and the brake pressure;
  determining the vehicle load and/or the vehicle weight from the model; and
  adapting the brake pressure to the determined vehicle load and/or the vehicle weight.

Disclosed herein is a system and method of detecting or determining the load of a vehicle, such as a passenger car, and of configuring the relationship between brake pedal force and/or brake pedal travel and the deceleration, in such a way that this relationship preferably remains constant over all the load conditions of the vehicle. Low friction of the brake lining or of the brake is also compensated for. The brake pressure can be increased or decreased depending on the situation. An increase in the brake pressure can be performed by means of a mechatronically activated master cylinder, the stability control pump, brake fluid from the low pressure accumulator and/or an active brake booster. A decrease in the brake pressure can be performed by means of a mechatronically activated master cylinder, low pressure accumulators of the antilock brake system (ABS) and/or an active brake booster. Adapting the brake pressure also improves the feeling or the feedback of the brake pedal for the driver.

In order to determine the deceleration, a signal of a wheel speed sensor can be derived over time. This is a simple computing operation applied to a signal of a sensor which is already present.

A pressure signal of a brake master cylinder and/or a travel signal of a pushrod of the brake can be used to determine the brake pressure. The pressure signal can be acquired from a circuit of a tandem master cylinder, either directly or by means of the stability control.

In order to produce the model, a desired master cylinder pressure can be placed in a relationship with the first derivative of the deceleration over time. The desired master cylinder pressure can be derived from the pedal movement and/or pedal force of the brake pedal.

A target window can be defined for the model. The target window can have an upper and/or lower target value, or a threshold value. The target window can be permanently predefined or can be selected or adapted as a function of certain driving situations or the like.

When the target window is missed, the desired master cylinder pressure can be raised if the rise in the first derivative of the deceleration over time is too low for a certain pressure. For example, for a vehicle with a heavy load it is possible in this way to raise the brake pressure in order to obtain, despite deceleration values which are worsened by the relatively high weight, a deceleration value which is typical of a vehicle with a normal load or low load and which is expected by the driver.

When the target window is missed, the desired master cylinder pressure can be lowered if the rise in the first derivative of the deceleration over time is too high for a certain pressure. For example, in the case of a vehicle with a very low load it is possible in this way to lower the brake pressure in order to adapt an excessively fast deceleration.

Further, a brake system for a vehicle having at least one brake and one brake master cylinder may comprise a control unit for adapting the pressure of the brake master cylinder according to steps described above.

The control unit can be connected to a unit for stability control and/or can be a component of the unit. This is advantageous since the unit for stability control has knowledge of the speeds of the vehicle and, if appropriate, of longitudinal accelerations and/or lateral accelerations.

The control unit can be connected to a control unit for the brake master cylinder and/or can be a component of this control unit. The brake booster can be provided instead of the control unit for the brake master cylinder and/or in parallel therewith. This is advantageous because the results of the control unit have effects on the brake master cylinder and/or the brake booster.

BRIEF DESCRIPTION OF THE DRAWINGS

In the text which follows, the invention will be explained in more detail with reference to the drawings, in which.

DETAILED DESCRIPTION OF EXEMPLARY EMBODIMENTS

The drawings serve merely to explain the invention and do not restrict it. The drawings and the individual parts are not necessarily to scale. Identical reference symbols denote identical or similar parts.

Figure 1:
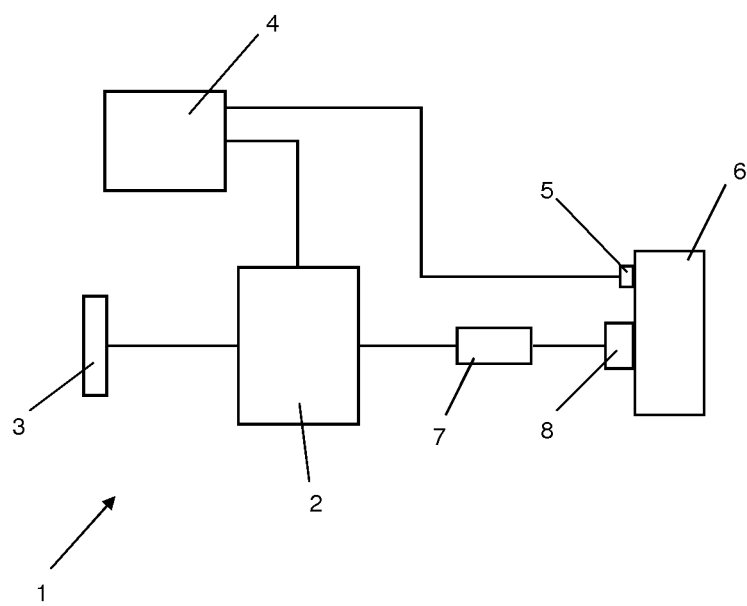
FIG. 1 shows a first schematic illustration of an exemplary brake system.

FIG. 1 shows a brake system 1 or a detail of the brake system 1 such as it is used for a vehicle, in particular a passenger car. The central component of the brake system 1 is a control unit 2 for controlling brake operations. A brake pedal 3 which is activated by a driver of the vehicle or a sensor 3 for sensing travel, force and/or position of the brake pedal is connected to the control unit 2. This connection can be direct as illustrated, or indirect via a further controller 4 such as, for example, an electronic stability control (ESC). The controller 4 and the control unit 2 may be implemented together.

The control unit 2 receives further signals from the electronic stability control 4, such as, for example, from a sensor 5 that measures the speed of a wheel 6. Sensors 5 are usually arranged on each wheel of the vehicle; for ease of illustration one wheel 6 with a sensor 5 is illustrated here. The signal of the sensor 5 can also be fed directly into the control unit 2.

The control unit 2 actuates a brake master cylinder 7 which may be implemented, for example, as a tandem master cylinder. The brake master cylinder 7 usually has a controller (not illustrated here). This controller and the control unit 2 can be implemented together.

The brake master cylinder 7 actuates a brake 8 for the wheel 6. The brake master cylinder 7 usually actuates all the brakes for all the wheels (not illustrated here) of the vehicle. The brake master cylinder 7 can actuate the brake 8 or a brake cylinder of the brake 8 directly or indirectly, for example via further cylinders or valves.

The control unit 2 can adapt the pressure of the brake master cylinder 7 and/or the pressure of the brake 8, that is to say increase it or decrease it.

Figure 2:
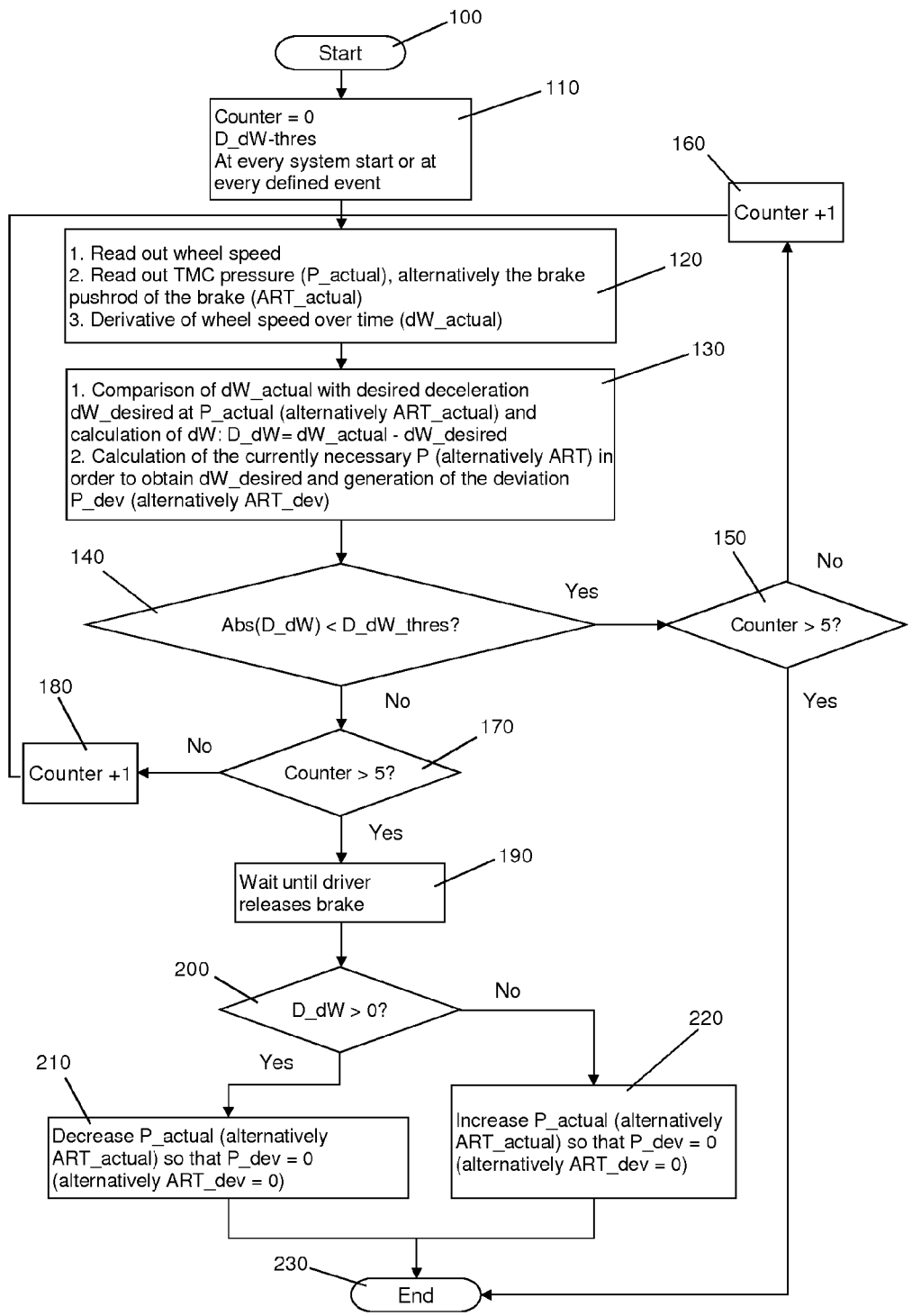
FIG. 2 shows a flowchart of a method for adapting an exemplary braking process.

In the text which follows, a method for adapting a braking process, in particular for different loads of a vehicle, will be described with reference to FIG. 2.

In a step or block 100, the method starts; The block 100 may be executed at every system start or vehicle start and/or at defined events, for example the engine control process or the ESC 4.

In a second step 110, a counter is set to an initial value of zero. Furthermore, a target window, or one or more limiting values D_dW_thres, is set for a deviation (D) of the first derivative of the wheel speed (dW) over time. This is carried out at every system or vehicle start, or at every defined event mentioned above.

In a further step 120, the wheel speed and the TMC (Tandem Master Cylinder) pressure (P_actual) are read. The TMC pressure corresponds to the brake pressure. As an alternative to the pressure, the travel of the brake pushrod or of the brake pedal of the brake (ART_actual) can be read or determined. Finally, the wheel speed is derived over time (dW_actual). The speeds of all the wheels can be read and derived. These values can be processed individually or jointly. The deceleration of the vehicle (dW) is therefore determined on the basis of one or more wheel speeds of the vehicle.

In a step 130, a model is produced of a relationship of the deceleration and the brake pressure. For this purpose, a desired master cylinder pressure may be placed in a relationship with the first derivative of the deceleration over time. Alternatively, a comparison may be made between the deceleration dW_actual and the desired deceleration dW_desired at P_actual (alternatively ART_actual), and a deviation of dW may be calculated as follows: D_dW=dW_actual−dW_desired. This results in an indication of the weight of the vehicle and of the load thereof and/or of the possible performance of the brakes.

Subsequently, the currently necessary brake pressure P (alternatively ART), is calculated in order to reach dW_desired, and the deviation P_dev (alternatively ART_dev) is generated. This calculation includes the weight of the vehicle and/or the load.

In a step 140 it is tested whether Abs(D_dW)<D_dW_thres applies, that is to say whether the absolute value of the deviation of the deceleration is within the target window.

If this is the case, the system branches back to a block 150. In the block 150 it is tested whether the counter>5 applies. If it does not, in a step 160 the counter is incremented by one and the system branches back between step 110 and 120. If this is the case (counter>5), the system branches to an end.

When the target window is missed in step 140, in a step 170 it is tested whether the counter>5 applies. If it does not, in a step 180 the counter is incremented by one and the system branches back between step 110 and 120. If this is the case (counter>5), the system branches to a step 190.

In step 190, the system detects that the driver releases the brake, or waits until the driver does so. Subsequently, in a step 200 it is tested whether the deviation of the deceleration is positive: D_dW>0

The testing in step 200 is followed by adaptation of the brake pressure P_actual to the determined vehicle load and/or the weight of the vehicle. In step 200 it is also possible to consider the situation that D_dW=0 applies, that is to say that there is no deviation present, and then the system branches, for example, to an end of the method or to the start.

If the deviation is positive, that is to say greater than zero, or if the rise in the first derivative of the deceleration over time is too high for a certain pressure, in a step 210 the desired master cylinder pressure is decreased. This can also be expressed by lowering the pressure P_actual (alternatively ART_actual), with the result that the deviation of the pressure is P_dev=0 (alternatively ART_dev=0).

If the deviation is negative, that is to say less than zero, or if the rise in the first derivative of the deceleration over time is too low for a certain pressure, in a step 210 the desired master cylinder pressure is increased. This can also be expressed by raising the pressure P_actual (alternatively ART_actual), with the result that the deviation of the pressure is P_dev=0 (alternatively ART_dev=0).

The two steps 210 and 220 are followed by the end of the method in a step 230. The method can be repeated periodically with and without deceleration over time and/or in response to defined events.

The foregoing steps or blocks do not necessarily have to be carried out precisely in the order shown. Further, all steps are not absolutely necessary; for example the step 190, in which the system waits for the driver to release the brake, can be removed.

The invention claimed is:

1. A method, comprising:
   determining a deceleration of a vehicle based on one or more wheel speeds of the vehicle;
   determining a brake pressure of the vehicle;
   producing a model of a relationship of the deceleration and the brake pressure;
   determining at least one of a vehicle load and a vehicle weight by using the model; and adapting the brake pressure according to a desired deceleration and at least one of the determined vehicle load and the vehicle weight.

2. The method of claim 1, wherein determining the deceleration includes deriving over time a signal of a wheel speed sensor.

3. The method of claim 1, wherein determining the brake pressure includes using at least one of a pressure signal of a brake master cylinder and a travel signal of a pushrod of the brake.

4. The method of claim 1, wherein producing the model includes placing a desired master cylinder pressure in a relationship with a first derivative of the deceleration over time.

5. The method of claim 4, further comprising defining a target window for the model.

6. The method of claim 5, wherein, when the target window is missed, the desired master cylinder pressure is raised if a rise in the first derivative of the deceleration over time is too low for the determined master cylinder pressure.

7. The method of claim 5, wherein when the target window is missed, the desired master cylinder pressure is lowered if the rise in the first derivative of the deceleration over time is too high for the determined master cylinder pressure.

8. A system comprising a control unit that is configured to:
   determine a deceleration of a vehicle based on one or more wheel speeds of the vehicle;
   determine a brake pressure of the vehicle;
   produce a model of a relationship of the deceleration and the brake pressure;
   determine at least one of a vehicle load and a vehicle weight by using the model; and
   adapt the brake pressure according to a desired deceleration and at least one of the determined vehicle load and the vehicle weight.

9. The system of claim 8, further comprising a stability control unit that is connected to the control unit.

10. The system of claim 8, further comprising a second control unit for the brake master cylinder, wherein the second control unit is connected to the control unit.

11. The system of claim 8, wherein determining the deceleration includes deriving over time a signal of a wheel speed sensor.

12. The system of claim 8, wherein determining the brake pressure includes using at least one of a pressure signal of a brake master cylinder and a travel signal of a pushrod of the brake.

13. The system of claim 8, wherein producing the model includes placing a desired master cylinder pressure in a relationship with a first derivative of the deceleration over time.

14. The system of claim 13, wherein a target window for the model is defined.

15. The system of claim 14, wherein, when the target window is missed, the desired master cylinder pressure is raised if a rise in the first derivative of the deceleration over time is too low for the determined master cylinder pressure.

16. The system of claim 14, wherein when the target window is missed, the desired master cylinder pressure is lowered if the rise in the first derivative of the deceleration over time is too high for the determined master cylinder pressure.

* * * * *